H. STOMMEL.
TILE PRESS.
APPLICATION FILED APR. 7, 1919.

1,321,160.

Patented Nov. 11, 1919.
3 SHEETS—SHEET 1.

Inventor
Hugo Stommel

By
Jas. H. Griffin.
Attorney

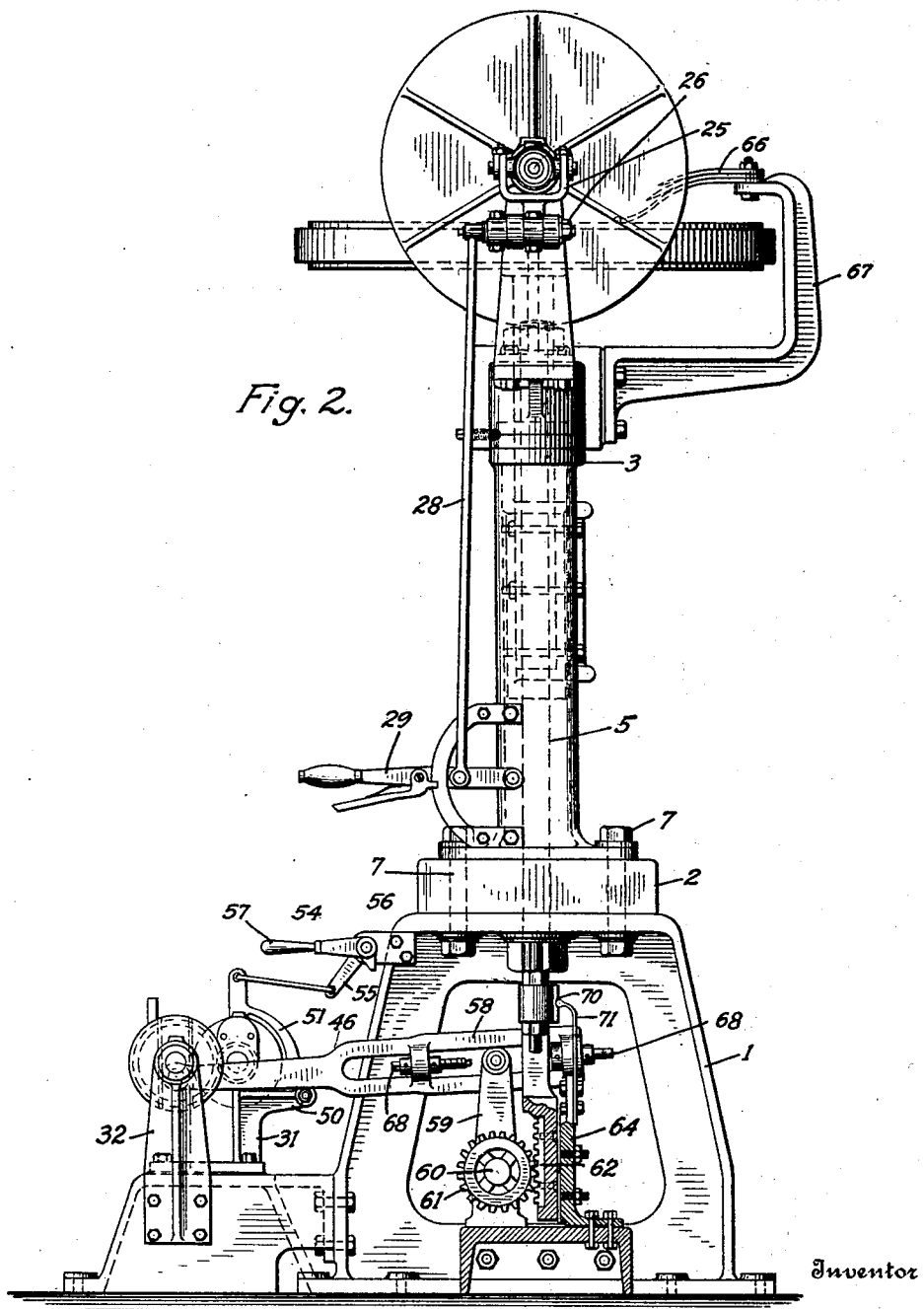

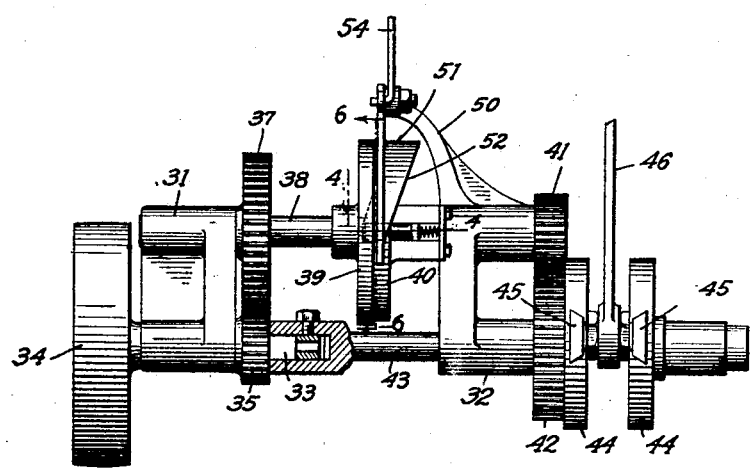
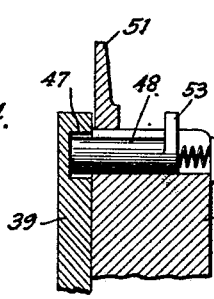
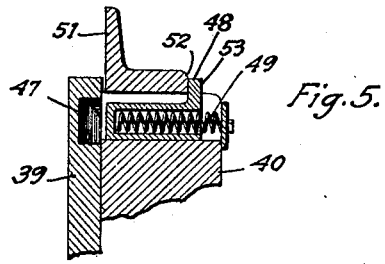
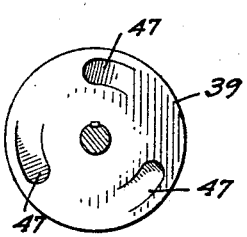
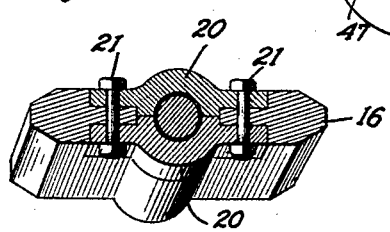

UNITED STATES PATENT OFFICE.

HUGO STOMMEL, OF RED BANK, NEW JERSEY.

TILE-PRESS.

1,321,160.  Specification of Letters Patent.  Patented Nov. 11, 1919.

Application filed April 7, 1919. Serial No. 288,166.

*To all whom it may concern:*

Be it known that I, HUGO STOMMEL, a citizen of the United States, residing in Red Bank, county of Monmouth, and State of New Jersey, have invented a certain new and useful Tile-Press, of which the following is a specification.

This invention is a press intended more particularly for the making of tiles and may be more specifically described as a friction driven tile press.

The machine of this invention is an improvement on the machine of my co-pending application Serial No. 252,288, filed Sept. 3, 1918, and certain objects of the invention though not exclusive ones are as follows: To provide a friction driven tile press wherein retractive movement of the friction wheel is cushioned through resilient means, the power of which is increased as the pressure of the friction wheel thereon increases; to provide a friction wheel with such a press with the periphery consisting of a plurality of relatively small friction blocks which may be separately removed and replaced in the advent of wear or breakage to facilitate the mechanical up-keep of the machine; to provide a machine of the character described having a cross-head and a stem for operating said cross-head and a rotatable connecting stem of the cross-head in a detachable manner and improved means which will be simply constructed and durable in use; to provide a tile press having a die supported above a table by bolts passing through the table and carried by a yoke operable to manipulate the die through conjoint operation of a tooth rack and an intermeshing spur gear; to provide a tile press wherein the above part of the press through which the power is transmitted to the lower part is secured to the lower part by tie or anchor bolts by spacers which are positioned to space these parts from one another; to provide a machine of the character described wherein the die is vertically reciprocated through rack and pinion connections operated through a crank from a connecting rod having lost motion with the crank for the purpose of allowing the die to recede during the compacting of the material forming the tiles; to provide a machine as described wherein the connecting rod is operated by a countershaft one half rotation of which serves to raise or lower the die and to provide a machine having a vertically movable die with means, independent of the operating mechanism for holding the die in raised position whereby the predetermined thickness of the resulting tiles is at all times assured.

Features of the invention other than those specified will be apparent from the following description when read in conjunction with the accompanying drawings.

In the accompanying drawings I have illustrated one practical embodiment of the invention, but the construction therein shown is to be understood as illustrative only, and not as defining the limits of the invention.

Fig. 2 is a side elevation thereof;

Fig. 3 is a plan view of the operating mechanism of the press;

Fig. 4 is a detailed section on the line 4—4 of Fig. 3 showing the parts as they appear in Fig. 3 with certain clutch mechanism locked together.

Fig. 5 is a view similar to Fig. 4 but showing the clutch parts as disengaged to one another.

Fig. 6 is a section on the line 6—6 of Fig. 3 showing the operating face of one on the clutch members, and Fig. 7 is a section through the cross-head of the machine taken in the plane of the line 7—7 of Fig. 1.

Figure 1:
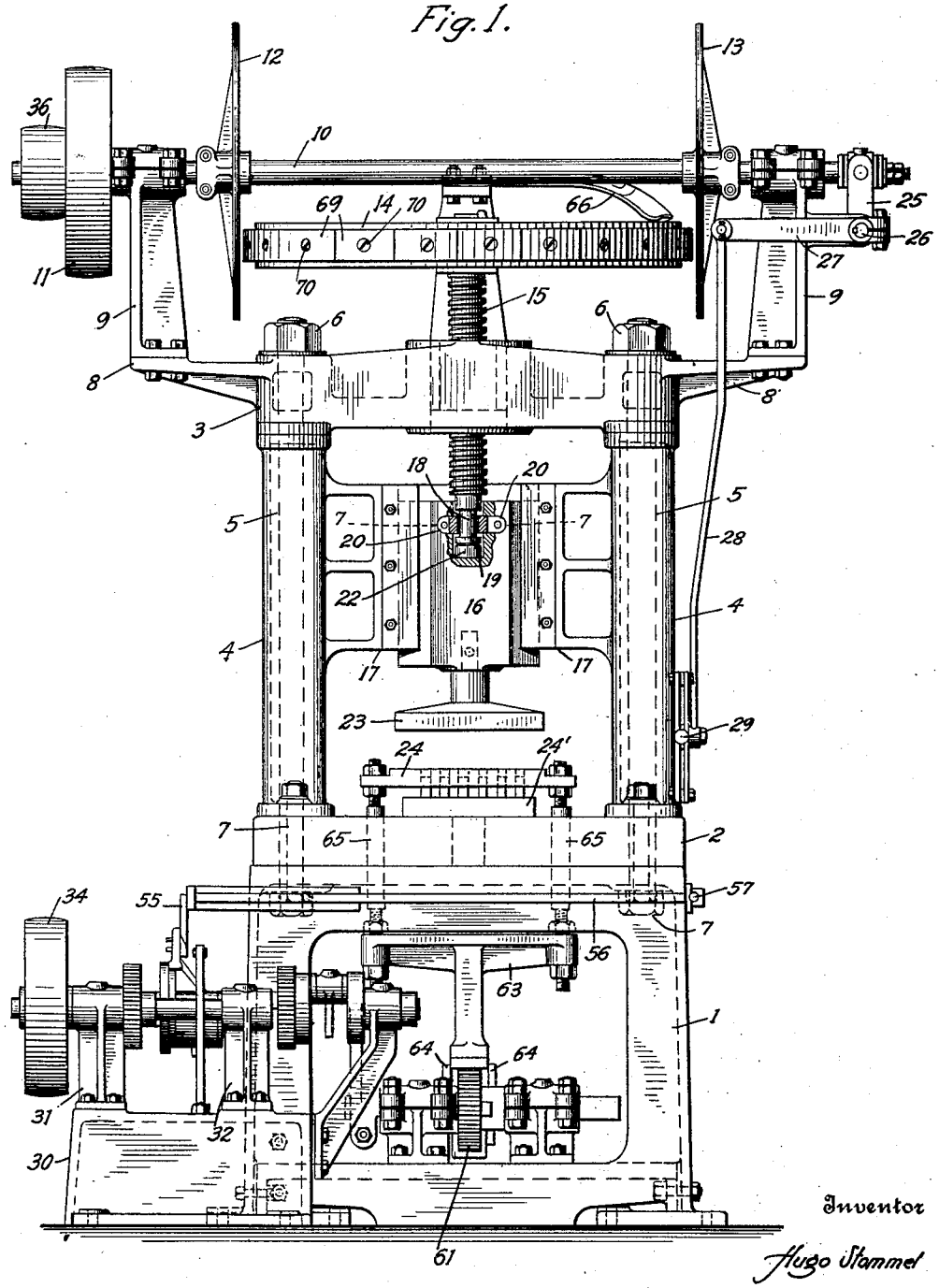
Figure 1 is a front elevation of a press embodying the present invention.

The machine of this invention embodies a base 1 which supports a table 2 above which is positioned a power head 3. The power head is spaced from the table by two cylindrical spacers 4 and long tie or anchor bolts extend through the power head, spacers, table and bed and receive nuts 6 which, when tightened, clamp the whole structure together. Additional bolts 7 are employed to more rigidly secure the spacers 4 and table 2 to the base 1. Extending laterally from the power head 3 are brackets 8 supporting standards 9 in which is journaled a transverse power shaft 10. The shaft is mounted for longitudinal sliding movement in the bearings of the standards 9 and is driven from a pulley 11. Fixed on shaft 10 are a pair of friction disks 12 and 13 which, when the shaft is reciprocated in opposite directions brings one or the other of said disks into engagement with the periphery of a friction wheel 14 to which they are adapted to impart rotary movement.

Friction wheel 14 is mounted on the threaded or screw stem 15 which is threaded through the power head 3 and has attached to its lower end a cross-head 16 mounted for vertical sliding movement in guides 17 supported by the spacers 4. The method of attaching the lower end of the screw 15 to the cross-head 16 is very important since the weight and strain on the machine is greatest at this point. Accordingly I have here shown an improved connection which obviates many of the difficulties heretofore prevalent in presses at this point.

In the construction shown the lower end of the screw 15 is reduced to provide a cylindrical portion 18 beneath which is left a head 19. The cross-head 16 is provided with an upright cylindrical hole into which the lower end of the stem 15 extends and the faces of the cross-head are cut away adjacent the cylindrical portion 18 to allow of the introduction thereinto of plates 20 adapted to embrace the cylindrical portion 18 and be bolted to the cross-head by bolts 21 as shown in Figs. 1 and 7. A bumper 22 is seated in the base of the hole in the cross head and on this bumper rests the lower end of the screw. The bumper 22 takes the force of the impact when the press is in operation while the plates 20 preclude relative longitudinal movement between the screw and the cross-head. As the cross head is reciprocated up and down it carries therewith a follower 23 which is adapted to coöperate with a die member 24 the operation of which will be hereinafter more fully given.

Vertical movement of the follower 23 results from the coöperation of the driving disks 12 and 13 with the friction wheel 14 and the desired movement of the follower may be through the controlling connections shown in Figs. 1 and 2. The yoke 25 is pivoted at 26 and is fixed to the shaft 10 against longitudinal movement without, however, precluding the rotation of the shaft. Pivotal movement is imparted to the yoke 25 from arm 27, fixed to shaft 24 and having link connection 28 with an operating handle 29 as shown best in Fig. 2. As the handle 29 is raised or lowered the shaft 10 is moved longitudinally to bring either of the disks 12 or 13 into engagement with the friction wheel 14 and rotate the same to impart movement to the follower. The handle 29 may however partake of a neutral position wherein neither of the disks engage with the wheel, at which time the wheel will be idle.

Bolted to the base 1 of the machine is an extension 30 carrying standards 31 and 32. In the standard 31 is journaled a stub shaft 33 on which is secured a driving pulley 34 and a pinion 35. The pulley 34 is adapted to be driven through a belt from a pulley 36 fixed on a shaft 10 and through these connections serve to drive the pinion 35. The pinion 35 meshes with the gear 37 mounted on a clutch shaft 38 and carrying a clutch disk 39 a detail of which is shown in Fig. 6. With the clutch disk 39 operates a second disk 40 fixed on a stub shaft to which is secured a pinion 41. The pinion 41 meshing with the gear 42 on a shaft 43. Shaft 43 has thereon an adjustable crank embodying a pair of disks 44 carrying adjustable slides 45 between which extends a wrist pin for actuating a connecting rod 46. The power is transmitted from the pulley 34 through the shafts and gears and through the clutch members 39 and 40 to operate the connecting rod 46.

The clutch members 39 and 40 consist of two disks and the former of which is forming a plurality of tapered recesses 47 and the latter of which carries a dog 48 which is forced by the spring 49 (see Figs. 3–6) into engagement with the recess face of the disk 39. As the disk 39 rotates the dog 48 enters one of the recesses 47 and locks the clutch members together so that the connecting rod 46 is driven from the pulley 34. Formed on the standard 32 is an arm 50 to which is pivoted a trip 51 having a cam face 52 adapted to coöperate with a lug 53 formed on the dog. A link 54 connects the trip 51 to an arm 55 fixed on a shaft 56 to the opposite end of which is secured a handle 57. Through the manipulation of the handle 57 the trip 51 may be oscillated into a position wherein it is out of the circular path of the dog 48 and when so positioned allows the clutch members to rotate in unison, the clutch member 39 driving the clutch member 40. However, when the handle 57 is in a position of Fig. 2, the trip 51 is moved to a position within the path of the lug 53 of the dog 48 so that, as the clutch members rotate the lug 53 is carried around and brought into engagement with the cam face 52, rides up on said face and causes the dog 48 to be withdrawn, as shown in Fig. 5. The clutch member 40 is thus released from the member 39 and thereafter the clutch 39 rides idly over the member 40 and no movement is imparted to the connecting rod 46. Through the connections described the connecting rod may be brought into operation or allowed to remain at rest through the manipulation of the handle 57. It will be noted that the shaft 43 projects beyond the bearing 32 and it is raised at its end to receive the end of the stub shaft 33. Relative rotation is allowed between these shafts and the construction shown is merely to allow of the separation of the gear 35 from the shaft 43.

The connecting rod 46 is provided at its free end with an elongated slot 58 adapted to receive a roller mounted on the end of a crank 59 fixed to a shaft 60. The shaft 60 carries a pinion 61 which meshes with a rack 62 mounted on the stem of a yoke 63. The stem of the yoke is mounted for vertical sliding movement in a guide 64 and said yoke carries a movable die 24 through tie-rods 65 which pass upwardly and through the table 2. Mounted on the table 2 is the fixed part 24' of the die provided with the usual upstanding cores adapted to coöperate with apertures in the movable part of the die.

The operation of the device will now be described, it being understood, that in normal idle position the parts are as shown in Figs. 1 and 2 of the drawings. The shaft 10 is rotating and is so positioned that neither of the disks 12 or 13 are in engagement with the friction wheel 14.

Clay or other material from which the tiles are to be made is placed onto the movable die 24 and is manipulated to fill the apertures in the die above the cores of the fixed die 24'. The superfluous clay is removed and the handle 29 is manipulated to shift the shaft 10 to bring one of the friction disks in engagement with the friction wheel. The wheel is rotated and the screw stem 15 forces down the cross-head 16 and brings the follower 23 into engagement with a movable die member 24 and forces said die member downwardly compressing the clay therein against the cores of the fixed die member 24'. This downward movement of the movable die is allowed by the slot 58 in the connecting rod 46. The material in the die having been compressed to the desired extent the handle 29 is operated to throw the other friction disk into engagement with the friction wheel 14 with the result that the cross-head is returned to the position of Fig. 1 and the friction disks are then moved in neutral position.

As the cross-head rises it is cushioned at the terminus of its travel by a plurality of leaf springs 66. There are a plurality of these leaves mounted on an arm 67 and so positioned that as the friction wheel rises it engages with the first leaf, forces it up into engagement with the second leaf and these two leaves are in turn forced up into engagement with the third so that as the wheel 14 reaches the top of its travel it is stopped by the conjoint action of all three springs so that the engagement of the hub of the friction wheel with the shaft 10 is precluded and said wheel is resultingly brought to a stop.

The follower 23 having been retracted, the handle 57 is next manipulated to shift the trip 51 out of engagement with the dog 48 and allow the spring 49 to force the dog 48 into one of the clutch recesses 47. The clutch members having been thus operatively connected the handle 57 is released and when the clutch has made one revolution the lug 53 again engages with the cam face 52 and disengages the clutch. During this period of operation the crank 44 has made one half a rotation and has manipulated the connecting rod 46 to operate the arm and has manipulated the crank 59 through the pinion 61 and rack 62 lowers the movable die member 24 and forces the newly made tile blanks from the die. These blanks are next removed from the machine and thereafter the handle 57 is manipulated to allow of another rotation of the clutch disk and consequently allow additional half rotation of the crank 44 with the result that the parts are returned to the position of Figs. 1 and 2 to allow of the introduction of material for the next set of tiles. In order that the lost motion between the crank 59 and the connecting rod 46 may be adjusted, adjusting screws 68 are mounted at the ends of the slot 58 so that the lost motion may be so fixed as to properly time the operations of the device.

When the parts are in the position shown in Fig. 1 it will be noted that pockets are left in the movable member 24 of the die above the cores of the fixed member 24' and these pockets receive the material to be compressed and formed into tiles. In order that the tiles made by the machine will be of uniform thickness it is essential that these pockets at all times be of the same depth and accordingly the stem of the yoke 63 is provided with a depression 70 (see Fig. 2) with which the nose of a spring 71 is adapted to coöperate. The advantage of this construction is that, when the die 24 is elevated, the nose of the spring 71 engages with the depression 70 and serves to hold the die 24 against slipping downwardly.

In the accompanying drawings I have illustrated a friction wheel which is highly efficient in operation and simple construction and durable. This wheel 14 is provided with a circumferential channel groove around which disposed blocks of wood 69 are positioned around the circumference of the wheel and held in engagement therewith by screws 70. The outer faces of these blocks are entirely separate from one another any one or more may be removed and replaced by new blocks in the advent of wear or breakage. This is a marked improvement over the prior constructions where the friction surface is continuous and extend entirely above the wheel and formed of a band or strip all of which must be removed in the advent of breakage or wear.

Having thus fully described the invention, what I claim as new, and desire to secure by Letters Patent is:

1. A tile press embodying a table, a fixed die member, supported by the table, a movable die member, a yoke, connections between the yoke and the movable die member fastened through the table, guiding means over the yoke a rack associated with said yoke and means for operating the rack to shift the movable die member toward and away from the fixed die member, said rack operating means embodying a member adapted for lost motion to allow of idle movement of the movable die member.

2. A tile press embodying a table, a fixed die member supported by the table a movable die member, a yoke, connections between the yoke and the movable die member fastened through the table, guiding means over the yoke, a rack associated with said yoke and means for operating the rack to shift the movable die member toward and away from the fixed die member in combination with means, independent of the rack operating means for locking the movable die member in coöperative relation with the fixed die member.

3. A tile press embodying fixed and movable die members, means for shifting the movable die member relative to the fixed die member and means, independent of the die shifting means for locking the movable member in operative relation to the fixed member of the die.

4. A tile press embodying a pair of relatively movable die members means for affecting relative movement between said members and means, independent of the die moving means for locking the die members in coöperative relation.

5. A tile press embodying a fixed die member, a movable die member, prime mover connections between the prime mover and the movable die member for imparting the movement to the latter and pressure applying mechanism for compressing material out of the die, said connection between the prime mover and the movable die being adapted to yield to allow of movement of the movable die member by the pressure means, for the purpose of compressing the material in the die.

6. A tile press embodying a movable die member, and power mechanism for moving said member, such mechanism embodying a connecting rod, slotted to allow of lost motion whereby limited movement of the movable die member may be had for the purpose of compressing tiles therein.

In testimony whereof, I have signed my name to this specification.

HUGO STOMMEL.

Copies of this patent may be obtained for five cents each, by addressing the "Commissioner of Patents, Washington, D. C."